United States Patent

(12) United States Patent
Channappagoudar et al.

(10) Patent No.: US 12,176,965 B2
(45) Date of Patent: Dec. 24, 2024

(54) METHOD AND ELECTRONIC DEVICE FOR IDENTIFYING AGGRESSOR NODES IN A COMMUNICATION NETWORK

(71) Applicant: SAMSUNG ELECTRONICS CO., LTD., Suwon-si (KR)

(72) Inventors: Manjunath Channappagoudar, Bangalore (IN); Saravanan Balasubramanian, Bangalore (IN); Varadarajan Seenivasan, Bangalore (IN); Mahesh Sawan Thakwani, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 309 days.

(21) Appl. No.: 17/945,539

(22) Filed: Sep. 15, 2022

(65) Prior Publication Data

US 2023/0080362 A1    Mar. 16, 2023

Related U.S. Application Data

(63) Continuation of application No. PCT/KR2022/013673, filed on Sep. 14, 2022.

(30) Foreign Application Priority Data

Sep. 15, 2021   (IN) .............................. 202141041508
Aug. 25, 2022   (IN) .............................. 202141041508

(51) Int. Cl.
*H04B 17/391*    (2015.01)
*H04B 17/336*    (2015.01)

(52) U.S. Cl.
CPC ....... *H04B 17/3913* (2015.01); *H04B 17/336* (2015.01)

(58) Field of Classification Search
CPC .......................... H04B 17/3913; H04B 17/336
See application file for complete search history.

(56) References Cited

U.S. PATENT DOCUMENTS

| 10,470,055 B1 | 11/2019 | Somashekar et al. |
| 11,018,784 B2 | 5/2021 | Ryan et al. |

(Continued)

FOREIGN PATENT DOCUMENTS

| CN | 106488488 | 3/2017 |
| CN | 107801199 | 3/2018 |

(Continued)

OTHER PUBLICATIONS

Search Report and Written Opinion dated Dec. 9, 2022 issued in International Patent Application No. PCT/KR2022/013673.

(Continued)

*Primary Examiner* — Duc C Ho
(74) *Attorney, Agent, or Firm* — Nixon & Vanderhye, P.C.

(57) ABSTRACT

Embodiments of disclosure relate to a method and an electronic device for identifying aggressor nodes in communication network. The method comprises receiving data related to a plurality of nodes of the communication network, from a network management entity, wherein the data comprises information on aggressor nodes and one or more victim nodes associated with the aggressor nodes; predicting an interference pattern indicating an interference caused by each of the aggressor nodes on the one or more victim nodes for at least one of a plurality of time instances, using a trained estimation model; and identifying at least one aggressor node having a possibility to interfere with the one or more victim nodes during the at least one of the plurality of time instances based on the interference pattern.

20 Claims, 7 Drawing Sheets

(56) References Cited

U.S. PATENT DOCUMENTS

| | | |
|---|---|---|
| 2010/0185726 A1 | 7/2010 | Kedem et al. |
| 2014/0018090 A1 | 1/2014 | Khoryaev et al. |
| 2014/0126403 A1 | 5/2014 | Siomina |
| 2015/0148050 A1 | 5/2015 | Siomina et al. |
| 2015/0326463 A1 | 11/2015 | Solondz |
| 2018/0302294 A1 | 11/2018 | Diancin et al. |
| 2020/0336228 A1* | 10/2020 | Ryan .................. H04J 11/0023 |
| 2020/0344619 A1 | 10/2020 | Gormley et al. |
| 2021/0185726 A1 | 6/2021 | Xu et al. |
| 2021/0219304 A1 | 7/2021 | Xu et al. |
| 2021/0234731 A1 | 7/2021 | Xu et al. |

FOREIGN PATENT DOCUMENTS

| | | | |
|---|---|---|---|
| CN | 110958613 | 4/2020 | |
| CN | 112956144 | 6/2021 | |
| EP | 386079 | 8/2021 | |
| WO | WO-2013025158 A1 * | 2/2013 | ........... H04L 5/0053 |
| WO | 2014/179351 | 11/2014 | |
| WO | 2018/231127 | 12/2018 | |
| WO | 2020/034239 | 2/2020 | |
| WO | 2020/063741 | 4/2020 | |
| WO | 2020/067952 | 4/2020 | |
| WO | 2020/070716 | 4/2020 | |
| WO | 2020/166946 | 8/2020 | |

OTHER PUBLICATIONS

Indian Office Action issued Jul. 19, 2023 in corresponding Indian Patent Application No. 202141041508.

Extended European Search Report dated Sep. 9, 2024 issued in European Patent Application No. 22870246.0.

* cited by examiner

METHOD AND ELECTRONIC DEVICE FOR IDENTIFYING AGGRESSOR NODES IN A COMMUNICATION NETWORK

CROSS REFERENCE TO RELATED APPLICATIONS

This application is a continuation of International Application No. PCT/KR2022/013673 designating the United States, filed on Sep. 14, 2022, in the Korean Intellectual Property Receiving Office and claiming priority to Indian Provisional Patent Application Serial No. 202141041508 (PS), filed on Sep. 15, 2021, in the Indian Patent Office, and to Indian Complete Patent Application Serial No202141041508 (CS), filed on Aug. 25, 2022, in the Indian Patent Office, the disclosures of all of which are incorporated by reference herein in their entireties.

BACKGROUND

Field

The disclosure relates to a method and an electronic device for identifying aggressor nodes in a communication network. More specifically, the disclosure relates to identifying aggressor nodes associated with tropospheric ducting.

Description of Related Art

In high-altitude regions, when sudden temperature variation happens, tropospheric duct is formed as shown in FIG. 1. The tropospheric duct is formed naturally when temperature inversion occurs generally over large bodies of water or over wide-open spaces. Signal from base stations escapes from normal range and enters the tropospheric duct and gets stuck inside the tropospheric duct. The signals travel hundreds of kilometers due to refraction and reflection, and thereby interfere with signals of other base station or eNodeB. The signal which escapes into the tropospheric duct from the base station/eNodeB(A) is called Aggressor node (A) which will affect an eNodeB(V) called Victims(V) eNodeB, which is hundreds of kilometers away from the aggressor node (A). Further, an aggressor node may affect many victim nodes, or many aggressor nodes may affect one victim node, or many aggressor nodes may affect many victim nodes. The interference of aggressor node and victim node leads to call drops, call cross connections, and throughput loss to end user. One aggressor may cause as many as ten thousand victim cells in high altitude regions. This is even more in Time Division Duplexing Long Term Evolution (TD-LTE) where Uplink (UL) and Downlink (DL) operate in same time domain.

Further, the greater the number of aggressor nodes the greater the number of victim nodes, and vice versa. If many aggressors and victim pair occur at a time instance, it inherently indicates a tropospheric duct has occurred. Also, number of victims may vary in one or more directions, as ducting behavior of the tropospheric duct may be different in different direction.

Currently, the existing system apply mitigation solutions after interference is occurred and detected at time 't'. The existing systems do not predict the aggressor node causing interfere with the victim nodes before the interference has occurred, thereby not passing benefit of mitigation to the end users.

The information disclosed in this background of the disclosure section is to aid in understanding of the general background of the disclosure and should not be taken as an acknowledgement or any form of suggestion that this information forms the prior art already known to a person skilled in the art.

SUMMARY

According to an example embodiment of the disclosure, a method for identifying aggressor nodes in a communication network is provided. The method may comprise receiving data related to a plurality of nodes of the communication network, from a network management entity. The data may include information on aggressor nodes and one or more victim nodes associated with the aggressor nodes. The method may comprise predicting an interference pattern indicating an interference caused by each of the aggressor nodes on the one or more victim nodes for at least one of a plurality of time instances using a trained estimation model. The method may comprise identifying at least one aggressor node having a possibility to interfere with the one or more victim nodes from the plurality of nodes during the at least one of the plurality of time instances based on the interference pattern.

According to an example embodiment, the present disclosure relates to an electronic device for identifying aggressor nodes in a communication network. The electronic device includes: a memory and a processor coupled to the processor. The processor may be configured to receive data related to a plurality of nodes of the communication network, from a network management entity. The data may comprise information on aggressor nodes and one or more victim nodes associated with the aggressor nodes. The processor may be configured to predict an interference pattern indicating an interference caused by each of the aggressor nodes on the one or more victim nodes for at least one of a plurality of time instances using a trained estimation model. The processor may be configured to identify at least one aggressor node having a possibility to interfere with the one or more victim nodes from the plurality of nodes during the at least one of the plurality of time instances based on the interference pattern.

According to an example embodiment of the disclosure, the present disclosure relates to a non-transitory computer readable medium storing instructions is provided. The instructions, when executed by a processor of an electronic device, cause the electronic device to perform operations. The operations may comprise receiving data related to a plurality of nodes of the communication network, from a network management entity. The data may include information on aggressor nodes and one or more victim nodes associated with the aggressor nodes. The operations may comprise predicting an interference pattern indicating an interference caused by each of the aggressor nodes on the one or more victim nodes for at least one of a plurality of time instances using a trained estimation model. The operations may comprise identifying at least one aggressor node having a possibility to interfere with the one or more victim nodes from the plurality of nodes during the at least one of the plurality of time instances based on the interference pattern.

The foregoing summary is illustrative only and is not intended to be in any way limiting. In addition to the illustrative aspects, embodiments, and features described above, further aspects, embodiments, and features will become apparent from reference to the drawings and the following detailed description.

BRIEF DESCRIPTION OF THE DRAWINGS

The accompanying drawings, which are incorporated in and include a part of this disclosure, illustrate various example embodiments and, together with the description, serve to explain the disclosed principles. The same reference numbers are used throughout the figures to reference like features and components. The above and other aspects, features and advantages of certain embodiments of the present disclosure will be more apparent from the following detailed description, taken in conjunction with the accompanying drawings, in which.

Figure 1:
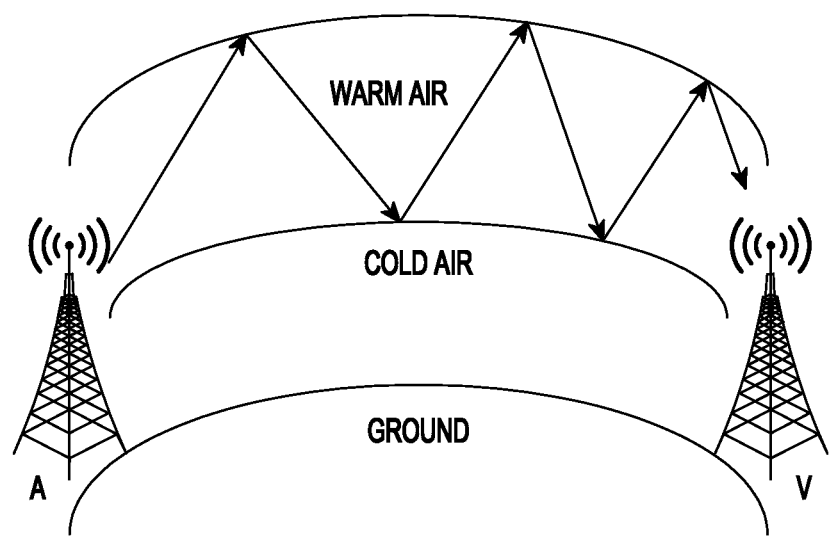
FIG. 1 is a diagram illustrating an example of a tropospheric duct formed at high altitude regions due to occurrence of sudden temperature variation.

It should be appreciated by those skilled in the art that any block diagrams herein represent conceptual views of illustrative systems embodying the principles of the present disclosure. Similarly, it will be appreciated that any flowcharts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the disclosure, the word "exemplary" is used herein to refer to "serving as an example, instance, or illustration." Any embodiment or implementation of the present disclosure described herein as "exemplary" is not necessarily to be construed as preferred or advantageous over any other embodiment(s).

While the disclosure is susceptible to various modifications and alternative forms, various example embodiments thereof are shown by way of example in the drawings and will be described in greater detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that various embodiments may be utilized and that changes may be made without departing from the scope of the present disclosure. The following description is, therefore, not to be taken in a limiting sense.

Present disclosure relates to a method and an identification device for identifying aggressor nodes in a communication network during tropospheric ducting. Generally, due to formation of tropospheric duct, signals from base station may escape into the tropospheric duct and cause interference with other base stations. Currently, the existing system apply mitigation solutions after interference is occurred and detected at time 't'. However, the existing system does not predict the interference beforehand. To address the above problem, the present disclosure identifies aggressor nodes in the communication network. The present disclosure receives data related to plurality of nodes from a network management entity. The data includes details regarding aggressor nodes and corresponding victim nodes. Further, the present disclosure predicts interference patter caused by each aggressor node on the corresponding victim nodes for some time instances using a trained estimation model. That is, the present disclosure may predict the interference pattern for either 1-hour, 2-hour, 3-hour, and the so on, depending on user requirement. The present disclosure utilizes the interference pattern to identify aggressor node having possibility to interfere with the corresponding victim nodes for the time instances. Thus, the present disclosure is able to apply mitigation solution before the occurrence of the interference and avoid call drop, cross connection and the like caused due to interference.

Figure 2:
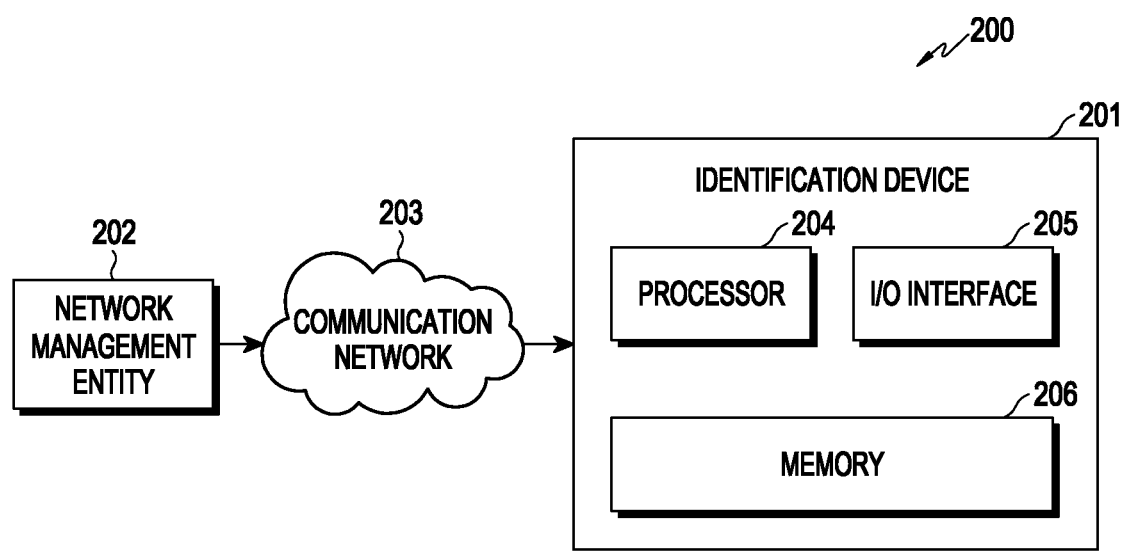
FIG. 2 is a diagram illustrating an example environment of communication network for identifying aggressor nodes in the communication network during tropospheric ducting, according to various embodiments.

FIG. 2 is a diagram illustrating an example environment of a communication network 200 for identifying aggressor nodes in the communication network 200 during tropospheric ducting according to various embodiments. The communication network 200 comprises an identification device 201 and a Network Management Entity (NME) (202). The NME 202 may be a virtual unit, or a physical unit which receives data related to a plurality of nodes of the communication network 200. The data comprises details regarding aggressor nodes and corresponding one or more victim nodes. The NME 202 communicates with the identification device 201 vis a communication network 203 for identifying aggressor nodes in the communication network 200 during tropospheric ducting. The aggressor nodes of the communication network 200 are nodes which cause interference with the corresponding one or more victim nodes during the tropospheric ducting. The identification device 201 may include, but is not limited to, a Personal Computer (PC), a laptop computer, a desktop computer, a server, a network server, a cloud-based server, and the like. Further, the identification device 201 may include a processor (e.g., including processing circuitry) 204, I/O interface (e.g., including I/O circuitry) 205, and a memory 206. In various embodiments, the memory 206 may be communicatively coupled to the processor 204. The memory 206 stores instructions, executable by the processor 204, which, on execution, may cause the identification device 201 to identify aggressor nodes in the communication network 200 during tropospheric ducting, according to various embodiments.

In an embodiment, the communication network 203 may include, without limitation, a direct interconnection, Local Area Network (LAN), Wide Area Network (WAN), Controller Area Network (CAN), wireless network (e.g., using Wireless Application Protocol), the Internet, and the like.

In a communication network 200, during training, the identification device 201 obtains training data associated with the plurality of nodes from one or more sources. The training data may include, but is not limited to, signal data associated with the plurality of nodes, location information and identity information of the plurality of nodes. The signal data comprises signal to Noise Ratio (SNR), and a Special Sub Frames (SSF). The location information comprises distance and direction information of the plurality of nodes. Upon obtaining the training data, the identification device 201 identifies one or more aggressor nodes along with respective one or more victim nodes. The one or more aggressor nodes and the respective one or more victim nodes is identified by comparing the signal data of each of the plurality of nodes with a predefined threshold value. In an embodiment, the SNR and the SSF value of each of plurality of nodes is compared with predefined (e.g., specified) threshold value to identify the one or more aggressor nodes and the respective one or more victim nodes. The identification device 201 divides a spatial region of an aggressor node of the one or more aggressor nodes into a plurality of sub-spatial regions using a plurality of hyperplanes. The plurality of hyperplanes is separated by a predefined angle. In an embodiment, the predefined angle may be 45°. In an embodiment, the spatial region may be divided into eight sub-spatial regions. Further, the identification device 201 clusters the one or more victim nodes into each of the plurality of sub-spatial regions based on location information of the one or more victim nodes in relation to the aggressor node. In an embodiment, the identification device 201 may utilize a cosine similarity distance measure to cluster the one or more victim nodes into each of the plurality of sub-spatial regions. A person skilled in the art may appreciate that the one or more victim nodes may be clustered using other clustering techniques and is not limited to cosine similarity as mentioned above. The identification device 201 identifies a first distance and a second distance for the spatial region of the aggressor node based on location information of the aggressor node. The first distance is greater than the second distance. In an embodiment, the first distance may be referred as long-distance range (150 to 750 km) and the second distance may be referred as short-distance rage (20 to 150 km). The identification device 201 associates the first distance and the second distance with a plurality of predefined time series based on the user requirement. The plurality of predefined time series may include, but is not limited to, one-hour, two-hour, three-hour and four-hour. Upon associating, the identification device 201 generates an estimation model for each of the plurality of time series for the first distance and the second distance to predict the interference pattern. In an embodiment, four estimation model is generated for the first distance and another four-estimation model for the second distance. In an embodiment, depending on number of frequencies of the one or more victim nodes in the plurality of sub-spatial regions for the plurality of predefined time series, the estimation model is trained to understand if an interference has occurred or not for a time series. That is, if the number of frequencies of the one or more victim nodes is greater than a threshold frequency, then an interference may have occurred.

In the communication network 200, during real-time, the identification device 201 may receive data related to the plurality of nodes of the communication network 200, from the network management entity 202 associated with the communication network 200. The data may include details of aggressor nodes and corresponding one or more victim nodes identified during the training. The data related to the plurality of nodes may also include, but is not limited to, the location information and the identity information of the plurality of nodes. In an embodiment, the location information may include latitude and longitude information of the plurality of nodes. In an embodiment, the identification information of the plurality of nodes may include, ID of aggressor nodes, and ID of victim nodes. The identification device 201 predicts an interference pattern for at least one of a plurality of predefined time instances using a trained estimation model from a plurality of trained estimation models. The interference pattern indicates an interference caused by each of the aggressor nodes on the corresponding one or more victim nodes. The trained estimation model is selected based on the data and user requirement. For example, if a user wants to predict an interference pattern for one hour for the short distance, the estimation model associated with the short distance for one hour may be selected. Upon predicting, the identification device 201 identifies at least one aggressor node which may have a possibility to interfere with the corresponding one or more victim nodes during the at least one of the plurality of predefined time instance based on the interference pattern.

In an embodiment, upon identifying the at least one aggressor node, the user may perform one or more mitigation solutions to avoid the interference. The one or more mitigation solution may include, but is not limited to, increasing signal strength of nodes and the like.

Figure 3:
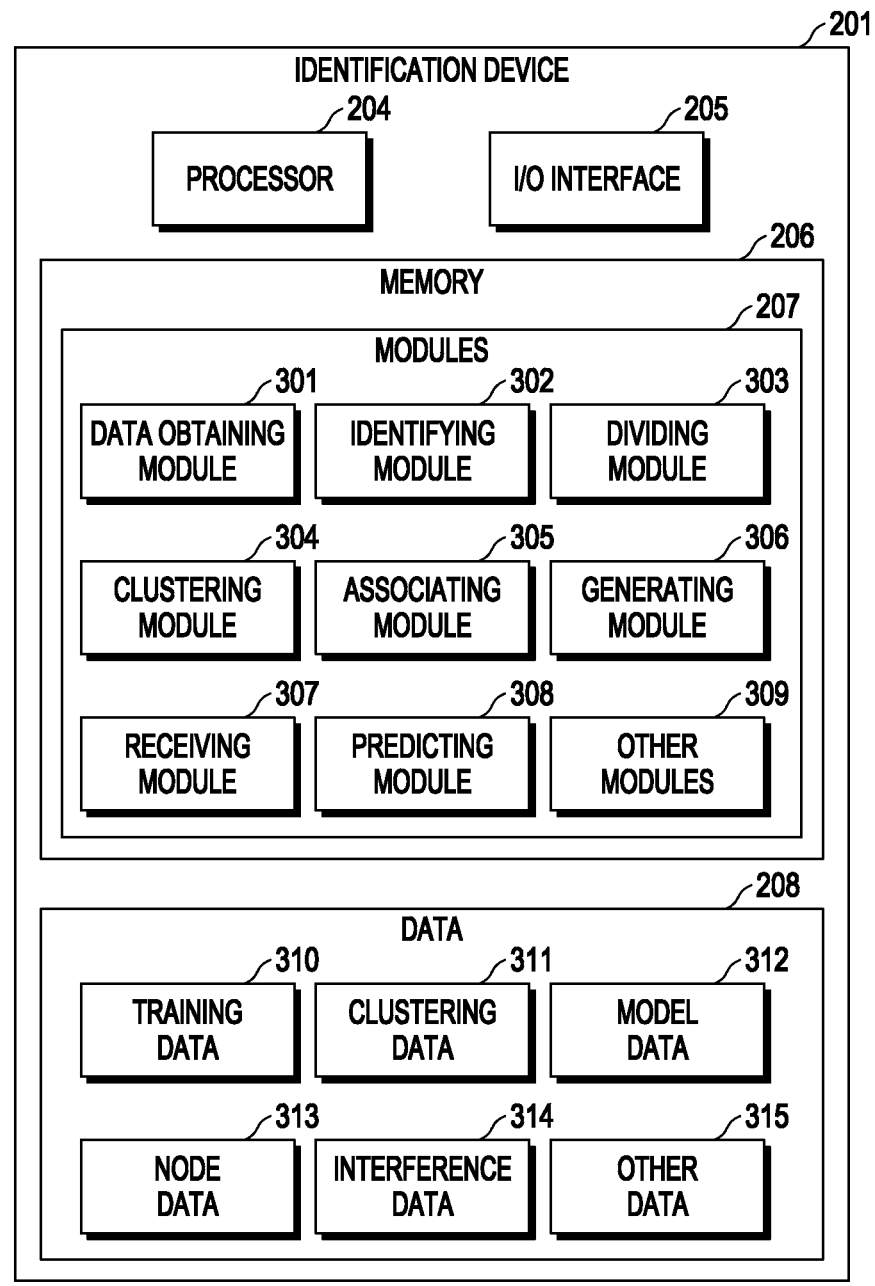
FIG. 3 is a block diagram illustrating an example configuration of an identification device for identifying aggressor nodes in a communication network during tropospheric ducting, according to various embodiments.

FIG. 3 is a block diagram illustrating an example configuration of an identification device for identifying aggressor nodes in a communication network during tropospheric ducting, according to various embodiments.

Data 208 and one or more modules 207 in the memory 206 of the identification device 201 is described herein in greater detail below.

In an embodiment, the one or more modules 207 may include, but are not limited to modules including executable program instructions executable by various processing circuitry, and may include, for example, a data obtaining module 301, an identifying module 302, a dividing module 303, a clustering module 304, an associating module 305, a generating module 306, a receiving module 307, a predicting module 308, and one or more other modules 309, associated with the identification device 201.

In an embodiment, the data 208 in the memory 206 may include training data 310, clustering data 311, model data 312, node data 313, interference data 314, and other data 315 associated with the identification device 201.

In an embodiment, the data 208 in the memory 206 may be processed by the one or more modules 207 of the identification device 201. The one or more modules 207 may be configured to perform the steps of the present disclosure using the data 208, for identifying aggressor nodes in a communication network 200 during tropospheric ducting. In an embodiment, each of the one or more modules 207 may be a hardware unit which may be outside the memory 206 and coupled with the identification device 201. In an embodiment, the one or more modules 207 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

The one or more modules 207 along with the data 208, may be implemented in any identification device 201, for identifying aggressor nodes in a communication network 200 during tropospheric ducting.

The training data 310 may include information related to the plurality of nodes. The training data 310 may include, but is not limited to, signal data associated with the plurality of nodes, location information and identity information of the plurality of nodes.

The clustering data 311 may include information regarding allocating the one or more victim nodes to each of the plurality of sub-spatial regions.

The model data 312 may include information regarding plurality of trained estimation model generated during the training.

The node data 313 may include information regarding the plurality of nodes. The node data 313 may include details of aggressor nodes and corresponding one or more victim nodes.

The interference data 314 may include information regarding interference pattern caused by the aggressor nodes on the corresponding one or more victim nodes.

The other data 315 may store data, including temporary data and temporary files, generated by modules for performing the various functions of the identification device 201.

During the training, the data obtaining module 301 may be configured to obtain the training data 310 associated with the plurality of nodes from one or more sources. The one or more sources may include, but is not limited to, database, the network management entity 202 and the like. The training data 310 comprises signal data such as SNR and SSF associated with the plurality of nodes. The identifying module 302 may be configured to identify one or more aggressor nodes along with respective one or more victim nodes from the plurality of nodes. The identifying module 302 compares the SNR and SSF of each of the plurality of nodes with the predefined threshold value. In an embodiment, if the SNR and SSF of the node is greater than the predefined threshold value, the identifying module 302 identifies the one or more aggressor node and the respective one or more victim nodes. Further, the dividing module 303 may be configured to divide spatial region of an aggressor node of the one or more aggressor nodes into plurality of sub-spatial regions using the plurality of hyperplanes. In an embodiment, the dividing module 303 may use four hyperplanes separated by an angle of 45° to divide the spatial region of the aggressor node into the plurality of sub-spatial regions. The clustering module 304 may be configured to cluster the one or more victim nodes into each of the plurality of sub-spatial regions. The clustering is performed based on location information of the one or more victim nodes in relation to the aggressor node. Upon clustering, the identifying module 302 may be configured to identify the first distance (long-distance range) and the second distance (short-distance range) for the spatial region of the aggressor node based on location information of the aggressor node. The associating module 305 may be configured to associate the first distance and the second distance with the plurality of predefined time series based on the user requirement. The generating module 306 may be configured to generate the estimation module for each of the plurality of predefined time series for the first distance and the second distance to predict the interference pattern.

Figure 4:
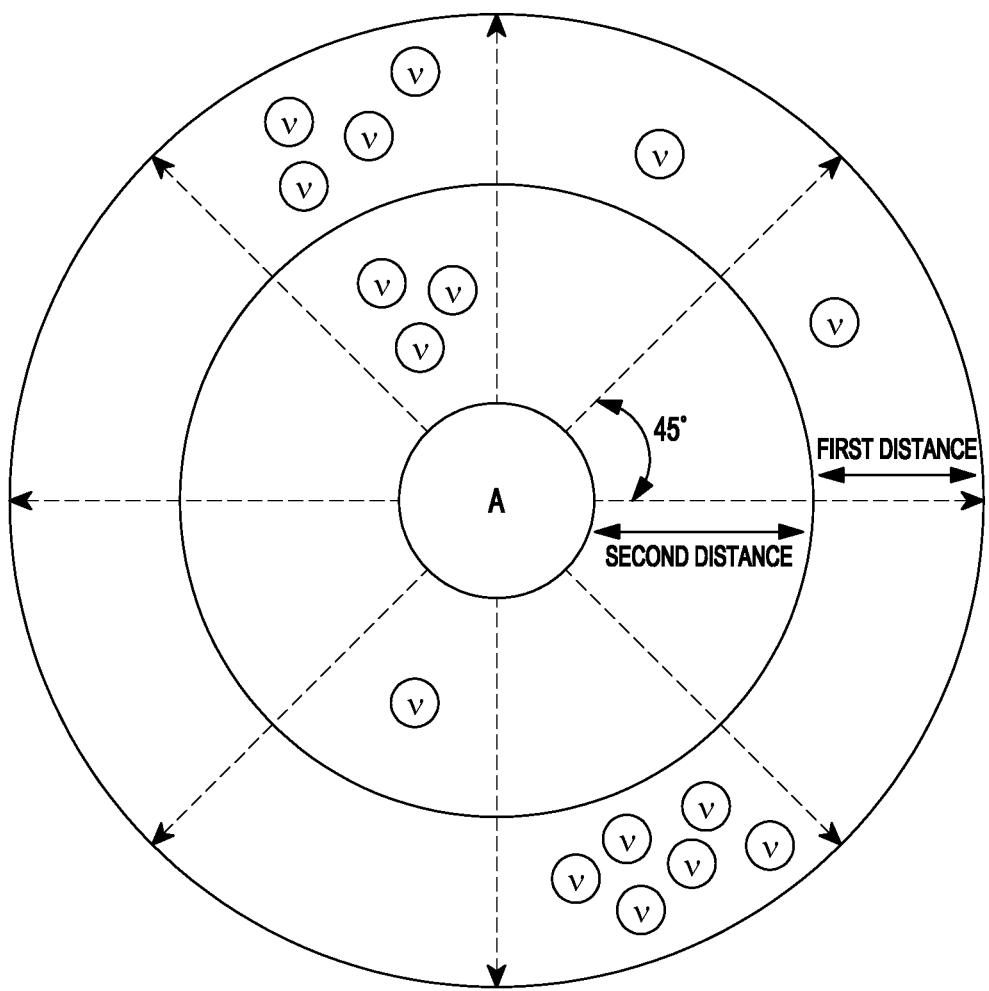
FIG. 4 is a diagram illustrating an example of generating models for predicting interference pattern, according to various embodiments.

For example, consider FIG. 4 which is a diagram illustrating an example of generating models for predicting interference pattern, according to various embodiments. Initially, the data obtaining module 301 obtains the training data 310 of the plurality of nodes of the communication network 200. The identifying module 302 identifies the one or more aggressor nodes and the respective one or more victim nodes by comparing the SNR and SSF of each of the plurality of nodes with the predefined threshold value. Upon identifying, the dividing module 303 divides the spatial region of an aggressor node of the one or more aggressor nodes into the plurality of sub-spatial regions. As shown in FIG. 4, an aggressor node is indicated as "A", outermost circle indicates the spatial region of the aggressor node "A" which is divided into eight sub-spatial regions using four hyper planes separated by an angle 45°. The four hyperplanes are indicated by the dotted lines as shown in FIG. 4. Further, the clustering module 304 clusters the one or more victim nodes indicated as "V" into the eight sub-spatial regions based on the location information of the one or more victim nodes "V" in relation to the aggressor node "A". In an embodiment, clustering is also performed based on the first distance and the second distance identified by the identifying module 302. The associating module 305 associate the first distance and the second distance with the plurality of predefined time series based on the user requirement. That is, the first distance is associated with the plurality of time series such as one-hour, two-hour, three-hour, and four-hour. Similarly, the second distance is associated with the plurality of time series such as one-hour, two-hour, three-hour, and four-hour. The generating module 306 generates the estimation model for each of the plurality of predefined time series for the first distance and the second distance for predicting the interference pattern.

Referring back to FIG. 3, during the real-time, the receiving module 307 may be configured to receive the data related to the plurality of nodes of the communication network 200, from the network management entity 202. The data comprises details of aggressor nodes and corresponding one or more victim nodes identified during the training. Upon receiving, the predicting module 308 may be configured to predict the interference pattern for at least one of the plurality of predefined time series using the trained estimation model. That is, predicting the interference pattern for either one-hour, two-hour, and so on depending on the user requirement. In an embodiment, depending on the user requirement the trained estimation model is selected from the plurality of trained estimation models. The interference pattern predicted by the predicting module 308 indicates interference caused by each of the aggressor nodes on the corresponding one or more victim nodes. For example, the each of the aggressor nodes may be associated with either one victim node or more than one victim nodes. The identifying module 302 may be configured to identify at least one aggressor node that may cause an inference with the corresponding one or more victim nodes during the at least one of the plurality of predefined time instances based on the predicted interference pattern.

The one or more modules 207 may also include other modules 309 such as, a frequency counting module, and a mitigation module to perform various miscellaneous functionalities of the identification device 201. The frequency counting module may count the number of one or more victim nodes in each of the plurality sub-spatial regions. The mitigation module may provide one or more actions to overcome the interference caused by the aggressor node. It will be appreciated that all the modules may be represented/configured as a single module or a combination of different modules.

Figure 5A:
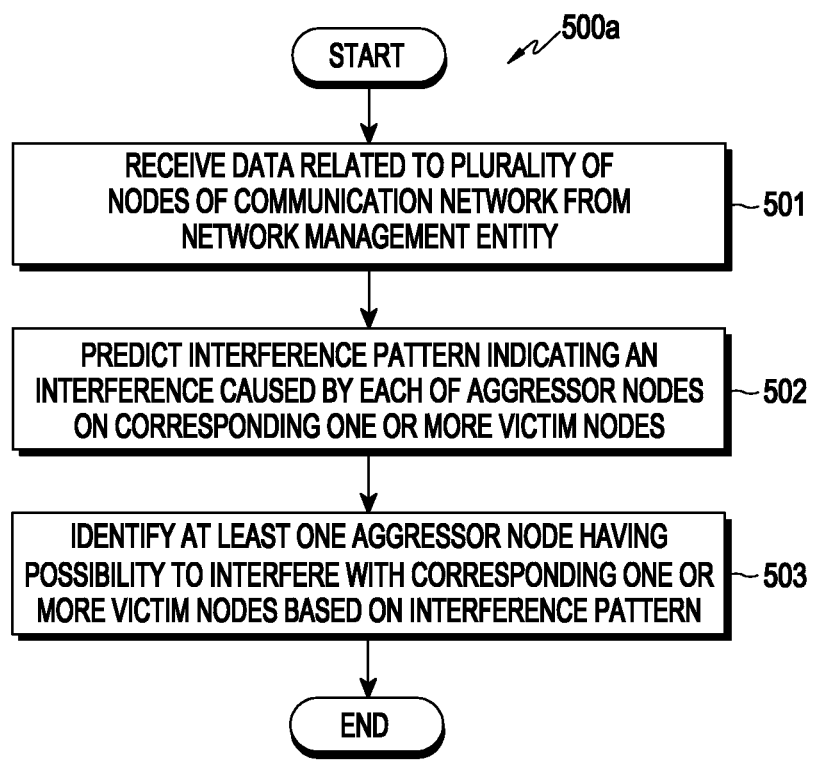
FIG. 5A is a flowchart illustrating an example method for identifying aggressor nodes in a communication network during tropospheric ducting, according to various embodiments.

FIG. 5A is a flowchart illustrating an example method for identifying aggressor nodes in a communication network during tropospheric ducting, according to various embodiments.

As illustrated in FIG. 5A, the method 500a may include one or more blocks for executing processes in the identification device 201. The method 500a may be described in the general context of computer executable instructions. Generally, computer executable instructions can include routines, programs, objects, components, data structures, procedures, modules, and functions, which perform particular functions or implement particular abstract data types.

The order in which the method 500a are described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 501, the method includes receiving, by the receiving module 307, the data related to the plurality of nodes of the communication network 200, from the network management entity 202 associated with the communication network 200. The data comprises details of aggressor nodes and corresponding one or more victim nodes. The data also comprises location information and identity information of the plurality of nodes. The location information comprises distance and direction information of the plurality of nodes.

At 502, the method includes predicting, by the predicting module 308, the interference pattern indicating an interference caused by each of the aggressor nodes on the corresponding one or more victim nodes for at least one of a plurality of predefined time instances, using the trained estimation model. The trained estimation model is selected from the plurality of trained estimation models based on the data and user requirement.

At 503, the method includes identifying, by the identifying module 302, at least one aggressor node having a possibility to interfere with the corresponding one or more victim nodes from the plurality of nodes during the at least one of the plurality of predefined time instance based on the interference pattern.

Figure 5B:
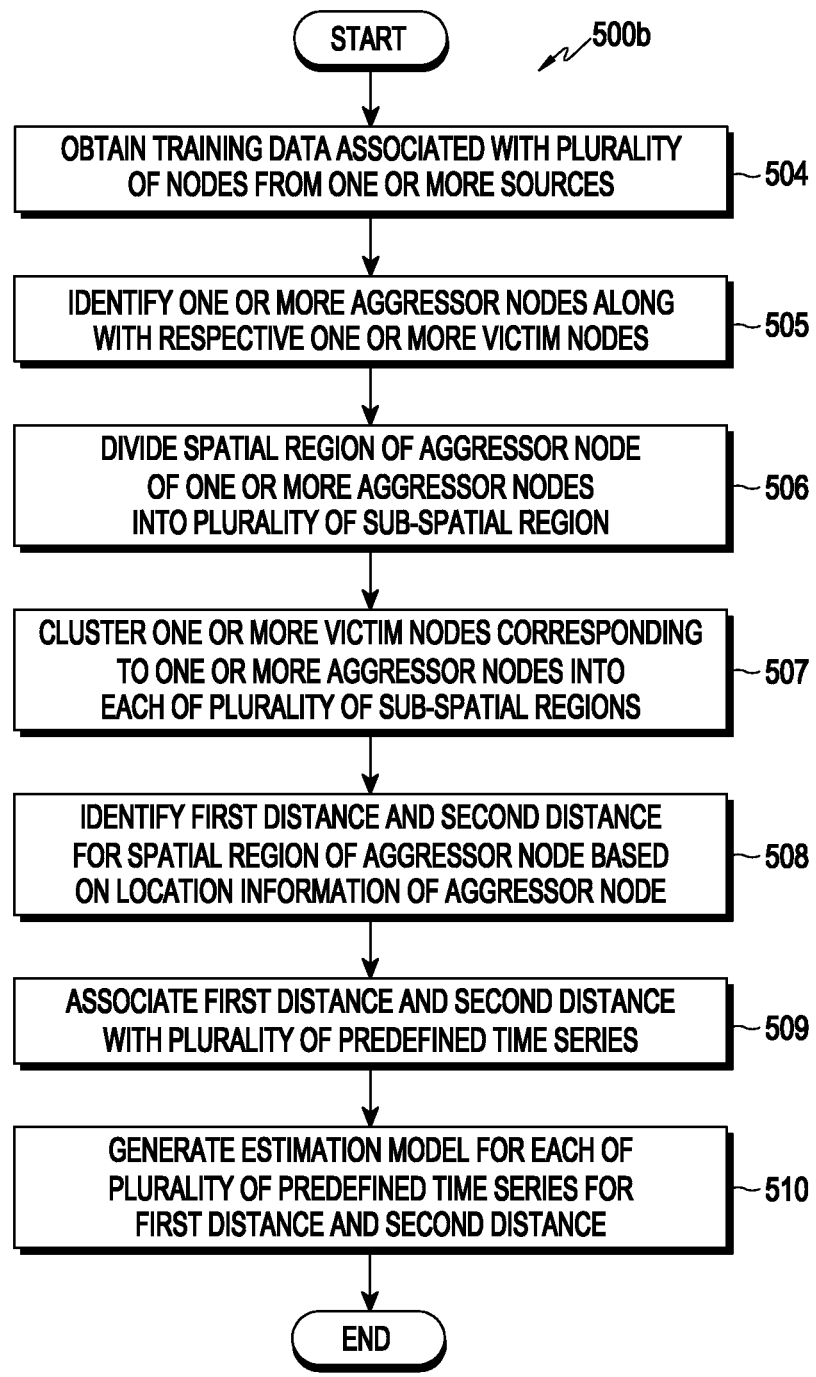
FIG. 5B is a flowchart illustrating an example method for generating plurality of estimation models for predicting interference pattern, according to various embodiments.

FIG. 5B is a flowchart illustrating an example method for generating plurality of estimation models for predicting interference pattern, according to various embodiments.

As illustrated in FIG. 5B, the method 500b may include one or more blocks for executing processes in the identification device 201. The method 500b may be described in the general context of computer executable instructions. Generally, computer executable instructions can include routines, programs, objects, components, data structures, procedures, modules, and functions, which perform particular functions or implement particular abstract data types.

The order in which the method 500b are described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At 504, the method includes obtaining, by the data obtaining module 301, the training data associated with the plurality of nodes from one or more sources. The training data comprises signal data associated with the plurality of nodes. The training data associated with the plurality of nodes comprise location information and identity information of the plurality of nodes. The signal data comprises the SNR, and the SSF.

At 505, the method includes identifying, by the identifying module 302, the one or more aggressor nodes along with respective the one or more victim nodes by comparing the signal data of each of the plurality of nodes with the predefined threshold value.

At 506, the method includes dividing, by the dividing module 303, the spatial region of the aggressor node of the one or more aggressor nodes into the plurality of sub-spatial regions using the plurality of hyperplanes. Each of the plurality of hyperplanes are separated by the predefined angle.

At 507, the method includes clustering, by the clustering module 304, the one or more victim nodes corresponding to the one or more aggressor nodes into each of the plurality of sub-spatial regions based on location information of the one or more victim nodes in relation to the aggressor node.

At 508, the method includes identifying, by the identifying module 302, the first distance and the second distance for the spatial region of the aggressor node based on location information of the aggressor node. The first distance is greater than the second distance.

At 509, the method includes associating, by the associating module 305, the first distance and the second distance with the plurality of predefined time series based on user requirement.

At 510, the method includes generating, by the generating module 306, the estimation model for each of the plurality of predefined time series for the first distance and the second distance to predict the interference pattern.

Computing System

Figure 6:
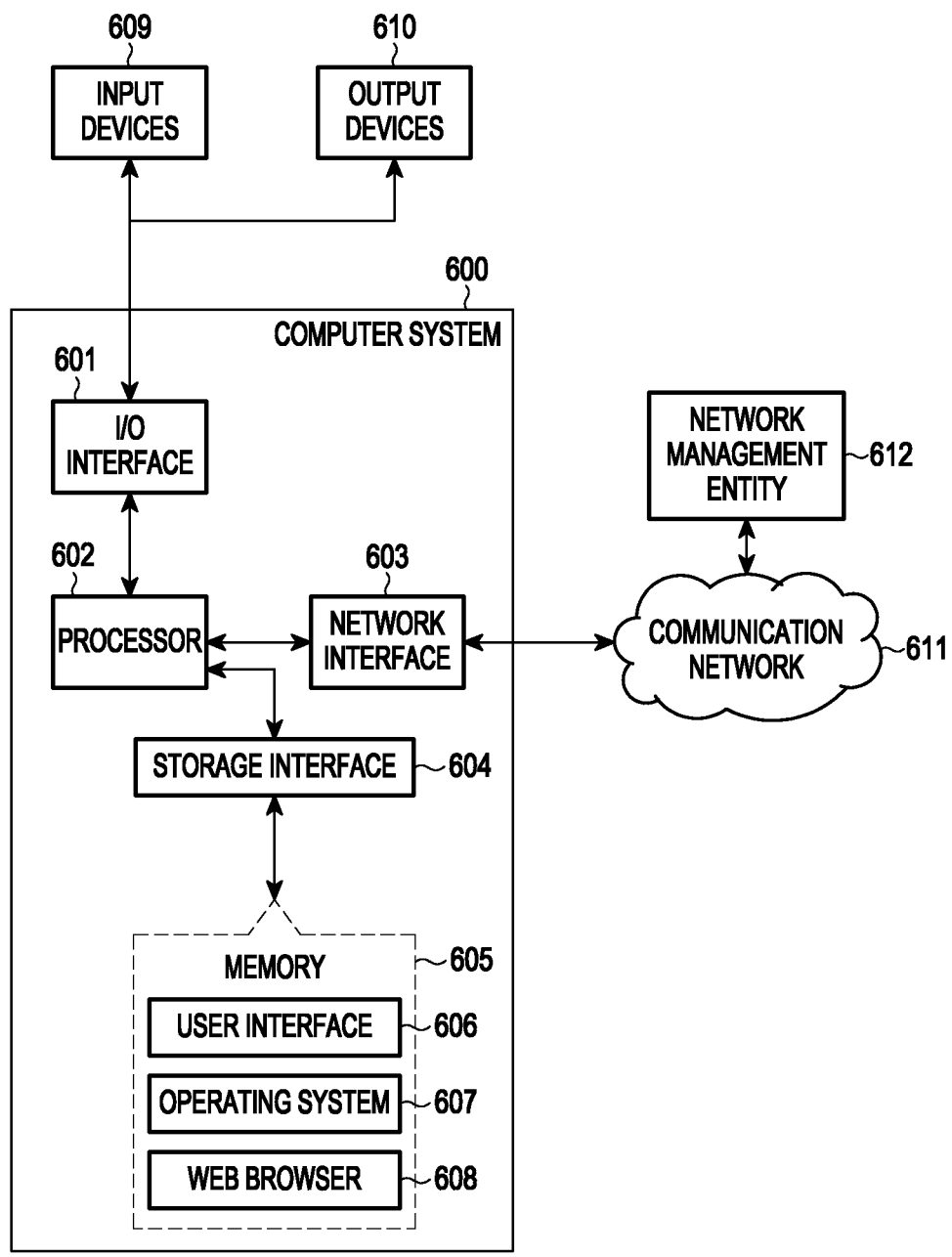
FIG. 6 is a block diagram illustrating an example configuration of a computer system according to various embodiments.

FIG. 6 is a block diagram illustrating an example configuration of a computer system 600 according to various embodiments. In an embodiment, the computer system 600 is used to implement the identification device 201. The computer system 600 may include a central processing unit ("CPU" or "processor" e.g., including various processing circuitry) 602. The processor 602 may include at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices (e.g., including I/O circuitry) 609 and 610 via I/O interface 601. The I/O interface 601 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices 609 and 610. For example, the input devices 609 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 610 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In various embodiments, the computer system 600 may include the identification device 201. The processor 602 may be disposed in communication with the communication network 611 via a network interface 603. The network interface 603 may communicate with the communication network 611. The network interface 603 may include various interface circuitry and employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with network management entity 612 for identifying aggressor nodes in the communication network 200 during tropospheric ducting. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In various embodiments, the processor 602 may be disposed in communication with a memory 605 (e.g., RAM, ROM, etc. not shown in FIG. 6) via a storage interface 604. The storage interface 604 may include various interface circuitry and connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In various embodiments, computer system 600 may store user/application data, such as, the data, variables, records, etc., as described in this disclosure. Such databases may be implemented as fault-tolerant, relational, scalable, secure databases such as Oracle® or Sybase®.

The operating system 607 may facilitate resource management and operation of the computer system 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in various embodiments. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provides a method for predicting interference pattern to identify an aggressor node causing an interference.

An embodiment of the present disclosure avoids collection of weather data, Internet of Things (IOT) power, hundreds of KPI related to strength, interference, and Received Signal Strength Indicator (RSSI) by an operator.

An embodiment of the present disclosure provides a method that works across country and regions there by giving generalization, scalable and low maintenance.

An embodiment of the present disclosure provides a method that works for predicting interference for multi-time instances. The present disclosure is easily configurable as it does not depend on multiple features.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the disclosure, and that the article of manufacture may include suitable information bearing medium known in the art.

The terms "an embodiment", "embodiment", "embodiments", "the embodiment", "the embodiments", "one or more embodiments", "some embodiments", and "one embodiment" may refer, for example, to "one or more (but not all) embodiments of the disclosure" unless expressly specified otherwise.

The terms "including", "comprising", "having" and variations thereof may refer, for example, to "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. A variety of optional components are described to illustrate the wide variety of possible embodiments of the disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the disclosure need not include the device itself.

The illustrated operations of FIGS. 5A and 5B illustrate various events occurring in a certain order. In various embodiments, certain operations may be performed in a different order, modified, or removed. Moreover, operations may be added to the above-described logic and still conform to the described embodiments. Further, operations described herein may occur sequentially or certain operations may be processed in parallel. Yet further, operations may be performed by a single processing unit or by distributed processing units.

The language used in the disclosure has been principally selected for readability and instructional purposes, and it may not have been selected to delineate or circumscribe the disclosed subject matter. It is therefore intended that the scope of the disclosure not be limited by this detailed description. Accordingly, the disclosure of the embodiments of the disclosure is intended to be illustrative, but not limiting, of the scope of the disclosure.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method of identifying aggressor nodes by an electronic device in a communication network, the method comprising:
    receiving data related to a plurality of nodes of the communication network, from a network management entity, wherein the data comprises information aggressor nodes and one or more victim nodes associated with the aggressor nodes;
    predicting an interference pattern indicating an interference caused by each of the aggressor nodes on the one or more victim nodes for at least one of a plurality of time instances, using a trained estimation model; and
    identifying at least one aggressor node having a possibility to interfere with the one or more victim nodes during the at least one of the plurality of time instances based on the interference pattern.

2. The method of claim 1, wherein the trained estimation model is selected from a plurality of trained estimation models based on the data and user requirement.

3. The method of claim 2, further comprising training the plurality of estimation models,
    wherein training the plurality of estimation models comprises:
    obtaining training data associated with the plurality of nodes from one or more sources, wherein the training data comprises signal data associated with the plurality of nodes;
    identifying one or more aggressor nodes with respective one or more victim nodes by comparing the signal data of each of the plurality of nodes with a predefined threshold value;
    dividing a spatial region of an aggressor node of the one or more aggressor nodes into a plurality of sub-spatial regions using a plurality of hyperplanes;
    clustering the one or more victim nodes corresponding to the one or more aggressor nodes into each of the plurality of sub-spatial regions based on location information of the one or more victim nodes in relation to the aggressor node;
    identifying a first distance and a second distance for the spatial region of the aggressor node based on location information of the aggressor node, wherein the first distance is greater than the second distance;

associating the first distance and the second distance with a plurality of time series based on user requirement; and generating an estimation model for each of the plurality of time series for the first distance and the second distance to predict the interference pattern.

4. The method of claim 3, wherein the data related to the plurality of nodes and the training data associated with the plurality of nodes comprise location information and identity information of the plurality of nodes.

5. The method of claim 3, wherein the signal data comprises a Signal to Noise Ratio (SNR), and a Special Sub Frames (SSF).

6. The method of claim 4, wherein the location information comprises distance and direction information of the plurality of nodes.

7. The method of claim 3, wherein each of the plurality of hyperplanes are separated by a specified angle.

8. An electronic device configured for identifying aggressor nodes in a communication network, comprising:
a memory; and
a processor coupled to the memory, wherein the processor is configured to:
receive data related to a plurality of nodes of the communication network, from a network management entity, wherein the data comprises details of aggressor nodes and one or more victim nodes associated with the aggressor nodes;
predict an interference pattern indicating an interference caused by each of the aggressor nodes on the one or more victim nodes for at least one of a plurality of time instances, using a trained estimation model; and
identify at least one aggressor node having a possibility to interfere with the corresponding one or more victim nodes during the at least one of the plurality of time instance based on the interference pattern.

9. The electronic device of claim 8, wherein the trained estimation model is selected from a plurality of trained estimation models based on the data and user requirement.

10. The electronic device of claim 9, wherein for training the plurality of estimation models, the processor is configured:
obtain training data associated with the plurality of nodes from one or more sources, wherein the training data comprises signal data associated with the plurality of nodes;
identify one or more aggressor nodes with respective one or more victim nodes by comparing the signal data of each of the plurality of nodes with a specified threshold value;
divide a spatial region of an aggressor node of the one or more aggressor nodes into a plurality of sub-spatial regions using a plurality of hyperplanes;
cluster the one or more victim nodes corresponding to the one or more aggressor nodes into each of the plurality of sub-spatial regions based on location information of the one or more victim nodes in relation to the aggressor node;
identify a first distance and a second distance for the spatial region of the aggressor node based on location information of the aggressor node, wherein the first distance is greater than the second distance;
associate the first distance and the second distance with a plurality of time series based on user requirement; and generate an estimation model for each of the plurality of specified time series for the first distance and the second distance to predict the interference pattern.

11. The electronic device of claim 10, wherein the data related to the plurality of nodes and the training data associated with the plurality of nodes comprise location information and identity information of the plurality of nodes.

12. The electronic device of claim 10, wherein the signal data comprises a Signal to Noise Ratio (SNR), and a Special Sub Frames (SSF).

13. The electronic device of claim 11, wherein the location information comprises distance and direction information of the plurality of nodes.

14. The electronic device of claim 10, wherein each of the plurality of hyperplanes are separated by a specified angle.

15. A non-transitory computer readable medium storing instructions which, when executed by a processor of an electronic device, cause the electronic device to perform operations, the operations comprising:
receiving data related to a plurality of nodes of the communication network, from a network management entity, wherein the data comprises information aggressor nodes and one or more victim nodes associated with the aggressor nodes;
predicting an interference pattern indicating an interference caused by each of the aggressor nodes on the one or more victim nodes for at least one of a plurality of time instances, using a trained estimation model; and
identifying at least one aggressor node having a possibility to interfere with the one or more victim nodes during the at least one of the plurality of time instances based on the interference pattern.

16. The non-transitory computer readable medium of claim 15, wherein the trained estimation model is selected from a plurality of trained estimation models based on the data and user requirement.

17. The non-transitory computer readable medium of claim 16, wherein the operations further comprises training the plurality of estimation models,
wherein training the plurality of estimation models comprises:
obtaining training data associated with the plurality of nodes from one or more sources, wherein the training data comprises signal data associated with the plurality of nodes;
identifying one or more aggressor nodes with respective one or more victim nodes by comparing the signal data of each of the plurality of nodes with a predefined threshold value;
dividing a spatial region of an aggressor node of the one or more aggressor nodes into a plurality of sub-spatial regions using a plurality of hyperplanes;
clustering the one or more victim nodes corresponding to the one or more aggressor nodes into each of the plurality of sub-spatial regions based on location information of the one or more victim nodes in relation to the aggressor node;
identifying a first distance and a second distance for the spatial region of the aggressor node based on location information of the aggressor node, wherein the first distance is greater than the second distance;
associating the first distance and the second distance with a plurality of time series based on user requirement; and generating an estimation model for each of the plurality of time series for the first distance and the second distance to predict the interference pattern.

18. The non-transitory computer readable medium of claim 17, wherein the data related to the plurality of nodes and the training data associated with the plurality of nodes comprise location information and identity information of the plurality of nodes.

19. The non-transitory computer readable medium of claim 17, wherein the signal data comprises a Signal to Noise Ratio (SNR), and a Special Sub Frames (SSF).

20. The non-transitory computer readable medium of claim 18, wherein the location information comprises distance and direction information of the plurality of nodes.

* * * * *